(12) United States Patent
Pellegrini

(10) Patent No.: US 11,879,906 B2
(45) Date of Patent: Jan. 23, 2024

(54) INERTIAL SENSOR SENSING OF VIBRATION FREQUENCY

(71) Applicant: InvenSense, Inc., San Jose, CA (US)

(72) Inventor: Aurelio Pellegrini, Sestola (IT)

(73) Assignee: InvenSense, Inc., San Jose, CA (US)

( * ) Notice: Subject to any disclaimer, the term of this patent is extended or adjusted under 35 U.S.C. 154(b) by 91 days.

(21) Appl. No.: 17/530,125

(22) Filed: Nov. 18, 2021

(65) Prior Publication Data

US 2023/0152345 A1    May 18, 2023

(51) Int. Cl.
| | | |
|---|---|---|
| *G01P 15/125* | (2006.01) | |
| *G01C 19/5712* | (2012.01) | |
| *G01P 1/00* | (2006.01) | |
| *G01D 1/08* | (2006.01) | |
| *G01H 1/14* | (2006.01) | |
| *G01D 1/02* | (2006.01) | |
| *G01D 1/16* | (2006.01) | |

(52) U.S. Cl.
CPC ........ *G01P 15/125* (2013.01); *G01C 19/5712* (2013.01); *G01P 1/00* (2013.01); *G01D 1/02* (2013.01); *G01D 1/08* (2013.01); *G01D 1/16* (2013.01); *G01H 1/14* (2013.01)

(58) Field of Classification Search
CPC ..... G01P 15/125; G01P 1/00; G01C 19/5712; G01D 1/02; G01D 1/16; G01D 1/18
USPC .......................................................... 702/75
See application file for complete search history.

(56) References Cited

U.S. PATENT DOCUMENTS

| | | | |
|---|---|---|---|
| 10,761,108 B2 | 9/2020 | Zhang | |
| 11,169,174 B2 | 11/2021 | Oshima et al. | |
| 11,703,521 B2* | 7/2023 | Reinke | .................. G01P 15/097 73/1.38 |
| 2009/0235717 A1* | 9/2009 | Samuels | ................. G01P 21/00 73/1.37 |
| 2021/0396520 A1 | 12/2021 | Gregory et al. | |

FOREIGN PATENT DOCUMENTS

| | | |
|---|---|---|
| CN | 113804185 A | 12/2021 |
| CN | 113819946 A | 12/2021 |
| FR | 3098295 B1 | 1/2021 |

* cited by examiner

*Primary Examiner* — Aditya S Bhat
(74) *Attorney, Agent, or Firm* — Van Hoven PC; Joshua Van Hoven

(57) ABSTRACT

A modified version of a MEMS self-test procedure is presented that can be used to detect the amplitude and frequency of an external vibration from an ambient environment. The method implements processing circuitry that correlates an output sense signal, s(t), with a plurality of periodic signal portions and a plurality of shifted periodic signal portions to generate a plurality of correlation values. A frequency associated with the external vibration is determined based on the plurality of correlation values.

21 Claims, 12 Drawing Sheets

INERTIAL SENSOR SENSING OF VIBRATION FREQUENCY

BACKGROUND

Numerous items such as smartphones, smart watches, tablets, automobiles, aerial drones, appliances, aircraft, exercise aids, and game controllers utilize sensors during their operation (e.g., motion sensors, pressure sensors, temperature sensors, etc.). In commercial applications, microelectromechanical (MEMS) sensors such as accelerometers and gyroscopes capture complex movements and determine orientation or direction. For example, smartphones are equipped with accelerometers and gyroscopes to understand the movement of the smartphone, to augment navigation systems that rely on Global Position System (GPS) information, and to perform numerous other functions. Wearable devices and internet-of-things (IoT) devices constantly measure movement and other characteristics of a person, animal, or electronic device. In another example, drones and aircraft determine orientation based on gyroscope measurements (e.g., roll, pitch, and yaw), and vehicles of all types implement assisted driving to improve safety (e.g., to recognize skid or roll-over conditions). In these end-use applications, the MEMS sensor is exposed to a variety of vibration types from a variety of vibration sources.

SUMMARY

In an embodiment of the present disclosure, a method for identifying a frequency of an external vibration by a microelectromechanical system (MEMS) inertial sensor comprises generating, by processing circuitry of the MEMS inertial sensor, a frequency scan signal pattern comprising a plurality of periodic signal portions each having a test frequency, sensing, by one or more sense electrodes of the inertial sensor, a movement of a proof mass of the inertial sensor over a period of time, and generating, by the processing circuitry of the inertial sensor, a sense signal based on the sensed movement of the proof mass over the period of time. The method may further comprise correlating, by the processing circuitry, the sense signal with the frequency scan signal pattern, generating, by the processing circuitry, a plurality of correlation values based on the correlating, wherein each of the plurality of correlation values is based on a correlation of the sense signal with one of the plurality of periodic signal portions, and identifying, by the processing circuitry, a frequency associated with the sense signal based on one or more of the generated plurality of correlation values.

In an embodiment of the present disclosure, microelectromechanical system (MEMS) inertial sensor comprises a frequency scan generator that generates a frequency scan signal pattern, wherein the frequency scan signal pattern comprises a plurality of periodic signal portions each having a test frequency, a proof mass that responds to an inertial force, and one or more sense electrodes that sense a movement of the proof mass. The method may further comprises sense circuitry coupled to the proof mass, wherein the sense circuitry is configured to generate a sense signal based on the sensed movement of the proof mass detected by the one or more sense electrodes, and processing circuitry coupled to the sense circuitry; wherein the processing circuitry is configured to receive the sense signal generated by the sense circuitry, correlate the sense signal with the plurality of periodic signal portions to determine a plurality of correlation values, and identify a frequency associated with the sense signal based on one or more of the generated plurality of correlation values.

In an embodiment of the present disclosure, a method for monitoring a suspended spring-mass system and identifying a frequency of an external vibration by a microelectromechanical system (MEMS) inertial sensor may comprise generating, by processing circuitry of the MEMS inertial sensor, a frequency scan signal pattern comprising a plurality of periodic signal portions each having a test frequency, providing the frequency scan signal pattern to a self-test drive electrode of the MEMS inertial sensor, and driving, by the self-test drive electrode, a proof mass of the suspended spring-mass system based on the frequency scan signal pattern. The method may further comprise sensing, by one or more sense electrodes of the inertial sensor, a movement of a proof mass of the inertial sensor over a period of time during which the frequency scan pattern drives the proof mass, and generating, by the processing circuitry of the inertial sensor, a sense signal based on the sensed movement of the proof mass over the period of time. The method may further comprise correlating, by the processing circuitry, the sense signal with the frequency scan signal pattern, identifying, by the processing circuitry, a frequency associated with the external vibration based on the correlating, and identifying, by the processing circuitry, an error associated with the suspended spring-mass system based on the correlating.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION OF DRAWINGS

MEMS sensors such as MEMS inertial sensors include movable components that respond to a particular force of interest. In the context of MEMS accelerometers and gyroscopes, a suspended spring-mass system is configured to isolate and respond to a movement of interest, such as a linear acceleration along an axis for a MEMS accelerometer or a rotation about an axis for MEMS gyroscope. These sensors are utilized in a variety of devices under a multitude of operating conditions, and as such are subject to a variety of external vibrations depending on the end-use device and application. In some instances, it may be desirable to understand the external vibratory environment for the MEMS sensor. For example, it may be desirable to measure and characterize a background vibration experienced by the sensor, so as to allow processing circuitry to better distinguish the background vibration from a desired force or movement to be measured. As another example, it may be desirable to understand and characterize the vibration environment under particular conditions, such as device start-up or the entry of an active processing mode from a sleep mode. As yet another example, a user or application (e.g., running on a processing unit of an end-use device) may wish to understand and quantify the vibrations in a current environment.

A MEMS inertial sensor includes a frequency scan drive that generates periodic signals at a variety of frequencies. These frequencies in turn are compared to an output sense signal of the MEMS inertial sensor, such as by correlation, to identify the signal content of a vibration at various frequencies. The frequency scan and comparison may be performed via a frequency sweep, in an iterative fashion, and/or at multiple levels of precision. In some implementations, the frequency scan may also be provided to drive the suspended spring-mass system to drive a proof mass (or proof masses), allowing simultaneous monitoring of external vibration signals and of the frequency response of the suspended spring-mass system. A number of modifications may be applied in order to more accurately capture vibration frequency information, such as also providing phase-shifted versions of the frequency scan to mitigate issues that occur with phase alignment of sense signals and frequency scan signals. Another exemplary modification includes generating averaged correlation values based on the comparison of the sense signal to both the frequency scan signal and the phase-shifted frequency scan signal. Another exemplary modification includes providing more granularity within the frequency scan signal, such as by providing a simulated sinusoidal signal (e.g., a stepwise sinusoidal signal).

Figure 1:
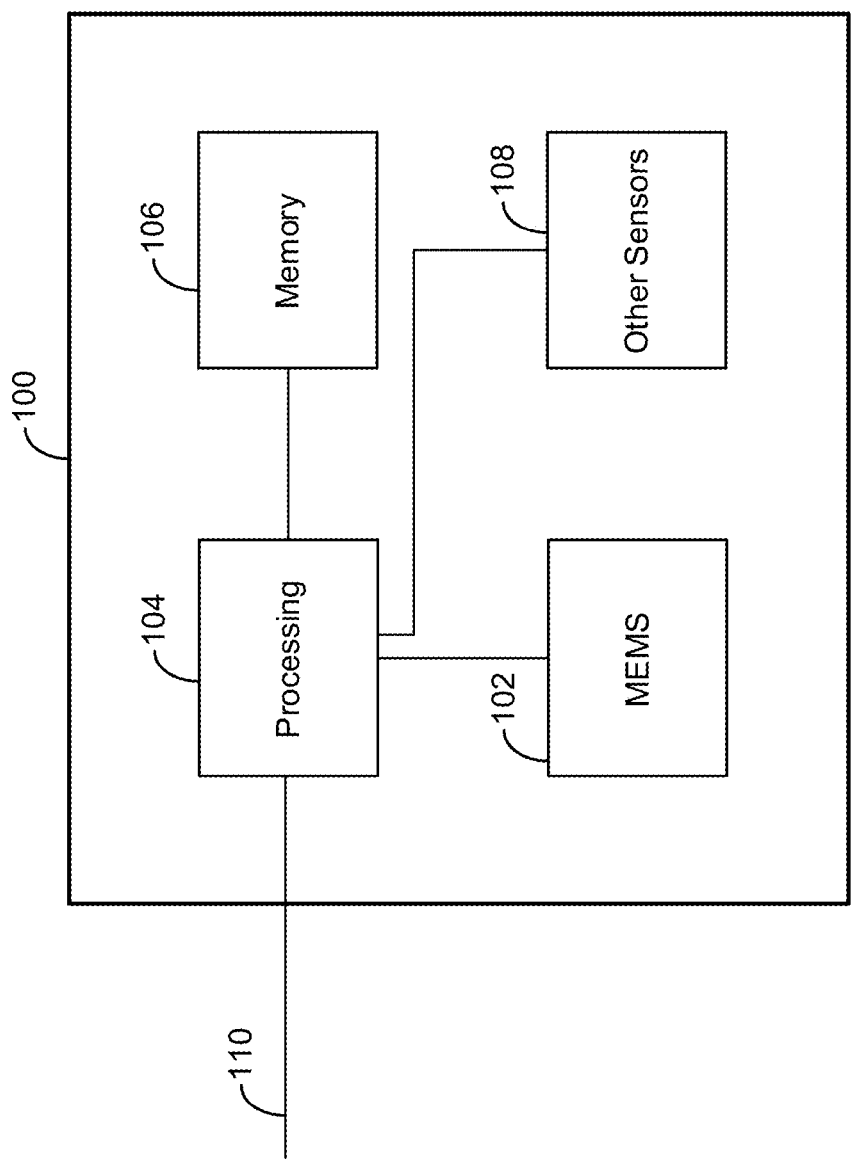
FIG. 1 shows an illustrative MEMS system in accordance with an embodiment of the present disclosure.

FIG. 1 depicts an exemplary MEMS system 100 in accordance with some embodiments of the present disclosure. Although particular components are depicted in FIG. 1, it will be understood that other suitable combinations of MEMS, processing components, memory, and other circuitry may be utilized as necessary for different applications and systems. In certain embodiments of the present disclosure, the circuitry, devices, systems, and methods described herein may be described in the context of a system including multiple MEMS inertial sensors including circuitry for identifying characteristics of an external vibration. However, it will be understood that that the circuitry, devices, systems, and methods described herein may be applied to other types of MEMS sensors and identification and analysis of a variety of noise sources. As non-limiting examples, the present disclosure may be utilized with low-cost seismic sensors for safety applications (e.g., emergency shutdown of household gas meter and appliances in case of earthquake) or with devices with custom software (e.g., a smartphone including inertial and/or pressure sensors, with customized sensor fusion software or embedded functionality) for identifying particular vibration frequency signals of interest or as a hazard.

In an embodiment as described herein, the MEMS system 100 may include at least a MEMS inertial sensor 102 (e.g., a single- or multi-axis inertial sensor for measuring motion along or about one or more axes) and supporting circuitry, such as processing circuitry 104 and memory 106. In some embodiments, one or more additional sensors 108 (e.g., MEMS gyroscopes, MEMS accelerometers, MEMS microphones, MEMS pressure sensors, temperature sensors, and a compass) may be included within the motion processing system 100 to provide an integrated motion processing unit ("MPU") (e.g., including 3 axes of MEMS gyroscope sensing, 3 axes of MEMS accelerometer sensing, microphone, pressure sensor, and compass).

Processing circuitry 104 may include one or more components providing necessary processing based on the requirements of the MEMS system 100. In some embodiments, processing circuitry 104 may include hardware control logic that may be integrated within a chip of a sensor (e.g., on a substrate or capacitor of a MEMS sensor 102 or other sensor 108, or on an adjacent portion of a chip to the MEMS sensor 102 or other sensor 108) to control the operation of the MEMS sensor 102 or other sensors 108 and perform aspects of processing for the MEMS sensor 102 or other sensors 108. In some embodiments, the MEMS sensor 102 and other sensors 108 may include one or more registers that allow aspects of the operation of hardware control logic to be modified (e.g., by modifying a value of a register). In some embodiments, processing circuitry 104 may also include a processor such as microprocessor that executes software instructions, e.g., that are stored in memory 106. The microprocessor may control the operation of the MEMS sensor 102 by interacting with the hardware control logic, and process signals received from MEMS sensor 102. The microprocessor may interact with other sensors in a similar manner. In some embodiments, some or all of the functions of the processing circuitry 104, and in some embodiments, of memory 106, may be implemented on an application specific integrated circuit ("ASIC") and/or a field programmable gate array ("FPGA").

Although in some embodiments (not depicted in FIG. 1), the MEMS sensor 102 or other sensors 108 may communicate directly with external circuitry (e.g., via a serial bus or direct connection to sensor outputs and control inputs), in an embodiment the processing circuitry 104 may process data received from the MEMS sensor 102 and other sensors 108 and communicate with external components via a communication interface 110 (e.g., a SPI or I2C bus, in automotive applications a controller area network (CAN) or Local Interconnect Network (LIN) bus, or in other applications suitable wired or wireless communications interfaces as is known in the art). The processing circuitry 104 may convert signals received from the MEMS sensor 102 and other sensors 108 into appropriate measurement units (e.g., based on settings provided by other computing units communicating over the communication bus 110) and perform more complex processing to determine measurements such as orientation or Euler angles, and in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS sensor 102 or other MEMS sensors 108.

In some embodiments, certain types of information may be determined based on data from multiple MEMS inertial sensors 102 and other sensors 108, in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

In accordance with the present disclosure, a periodic signal pattern may be generated at a variety of frequencies and utilized to test for vibrations at the MEMS sensor 102. An output sense signal of the MEMS sensor 102 is compared to a number of test signal patterns, for example, by correlating the sense signal with each of the signal patterns. The output correlation values for each of the tests can be compared to identify the frequency characteristics of the vibration pattern, based on the frequency content of the vibration at various frequencies.

Figure 2:
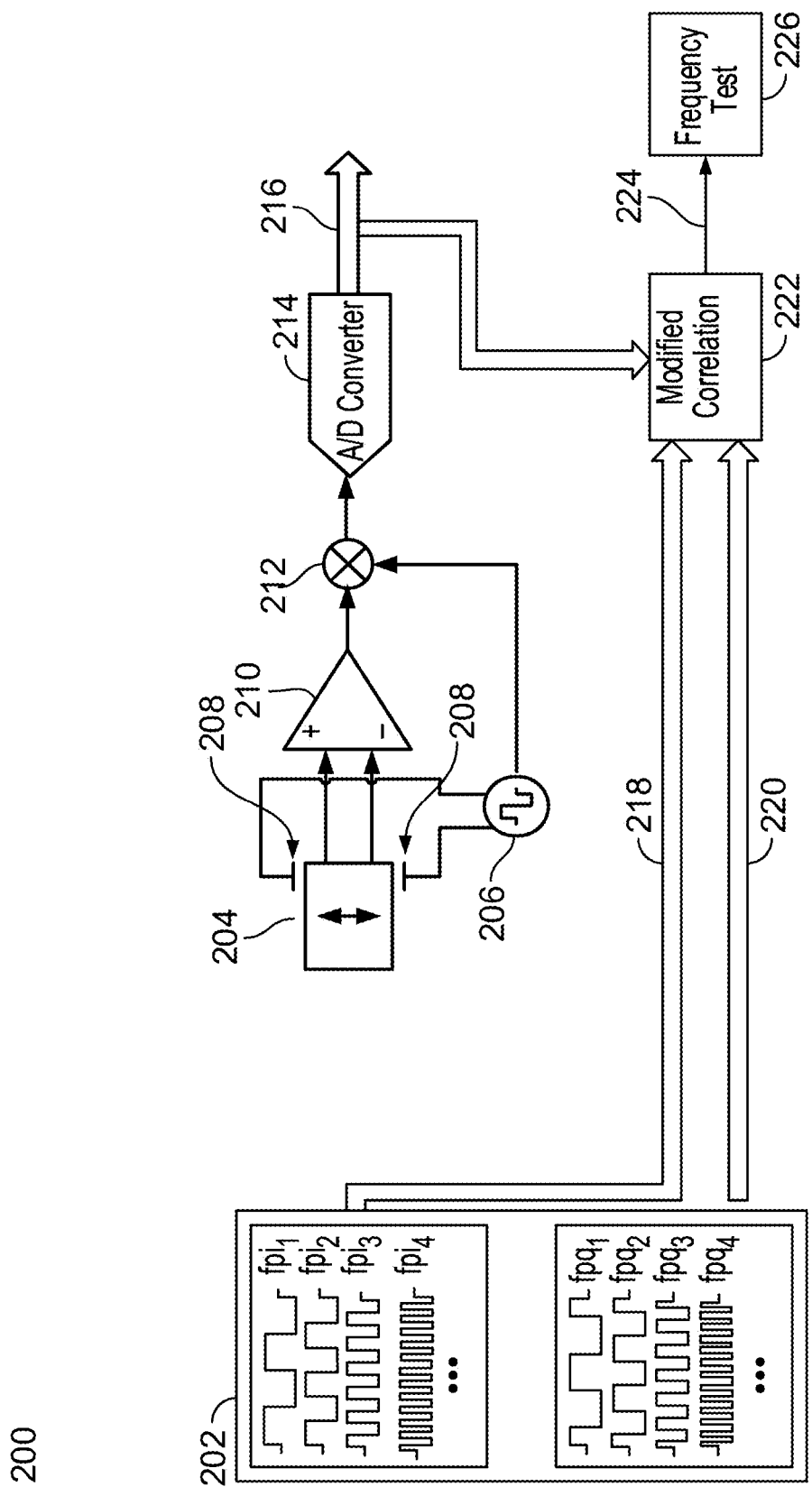
FIG. 2 shows an illustrative MEMS accelerometer with vibration monitoring in accordance with an embodiment of the present disclosure.

FIG. 2 shows an illustrative MEMS accelerometer with vibration monitoring in accordance with an embodiment of the present disclosure. In the depicted embodiment, an exemplary MEMS accelerometer 200 has a particular configuration for sensing an amplitude and a frequency of an external vibration acceleration, including a frequency scan generator, a proof mass, a signal generator of processing circuitry, sense electrodes, a capacitance to voltage (C2V) amplifier, a frequency mixer, an analog-to-digital converter, a sense signal, s(t), periodic signal portions, shifted periodic signal portions, a correlator, an averaged correlation value, and a frequency circuitry of processing circuitry. It will be understood that the present invention is applicable to a variety of MEMS sensor types that are capable of outputting signals corresponding to a vibration source (e.g., MEMS accelerometer, MEMS gyroscope, MEMS pressure sensor, etc.) in a variety of physical and circuitry configuration, including modifications to any of the above or other features such as additional sense electrodes, varied locations and types of processing circuitry, and additional circuitry such as additional processing circuitry (e.g., gain/offset/scaling or compensation circuitry).

The exemplary MEMS accelerometer 200 includes a frequency scan generator 202, which couples to correlator 222. The frequency scan generator 202 generates a frequency scan signal pattern, wherein the frequency scan signal pattern includes a plurality of periodic signal portions 218 and a plurality of shifted periodic signal portions 220, each having a test frequency, $f_k$ (e.g., at a frequency ranging from a few Hertz to an upper Nyquist frequency of a sampled sensor signal, such as 2 kHz). The frequency scan generator 202 generates and delivers the plurality of periodic signal portions 218 and the plurality of shifted periodic signal portions 220 to correlator 222. The shifted periodic signal portions 220 are shifted by $T_k/4$ (e.g., 90 degrees), wherein $T_k$ is the period of each sample of the frequency scan signal pattern (e.g., the time for one cycle of a waveform to complete). It will be understood that the shifted periodic signal portions 220 may be shifted by other suitable portions of the period of base periodic signal portion, in order to avoid signal correlation misalignment as described herein. In some embodiments, the frequency scan signal pattern, which includes the plurality of periodic signal portions 218 and the plurality of shifted periodic signal portions 220, may implement a plurality of signal amplitudes.

Proof mass 204 is located adjacent to sense electrodes 208 and receives an accelerometer drive signal (e.g., a carrier signal for the sensed movement or vibration tuned to the C2V converter 210 and other processing circuitry) from drive signal generator 206. It will be understood that in some embodiments the drive signal may be provided in other manners, such as via the proof mass. In some embodiments, the frequency scan generator 202 may drive proof mass 204 via an optional MEMS drive, as described herein for FIG. 4. As depicted in FIG. 2, in some embodiments, the MEMS accelerometer 200 may not include the optional MEMS drive, which results in the frequency scan signal pattern, including the periodic signal portions 218 and the shifted periodic signal portions 220, not being injected into proof mass 204. Accordingly, the respective frequencies, $f_k$, of the periodic signal portions 218 and the shifted periodic signal portions 220 are not injected into proof mass 204, so when the respective frequencies, $f_k$, are far from the external vibration frequency, $C_k$, an averaged correlation value 224, $C_k$, is close to zero.

Sense electrodes 208 form capacitors with proof mass 204 for sensing the proof mass's 204 movement, in accordance with the drive signal, relative to the sense electrodes 208. The proof mass's 204 movement generates a capacitance between sense electrodes 208 (e.g., parallel capacitor plates with respect to proof mass 204) and proof mass 204, which the proof mass 204 outputs to C2V converter 210 as capacitance signals. It will be understood that in other embodiments the sensing may be performed directly from the sense electrodes 208. The C2V converter 210 receives the capacitance signals and outputs a suitable signal (e.g., voltage or current proportional to the capacitance) to additional processing circuitry such as frequency mixer 212. The drive signal generator of processing circuitry 206 additionally couples to the frequency mixer 212, which receives output voltage signals from C2V converter 210 and the drive signal from signal generator of processing circuitry 206. Frequency mixer 212 cancels out the drive signal, implemented by signal generator of processing circuitry 206 at proof mass 204 via the sense electrodes 208, from the received voltage signals and delivers the resulting analog signals representative of the baseband output due to movement of the proof mass to analog-to-digital converter 214. Analog-to-digital converter 214 receives the analog signals from frequency mixer 212 and converts them into a digital signal (e.g., sense signal 216, s(t)). Sense signal 216, s(t), serves as an output signal of analog-to-digital converter 214 and is a digital representation of the movement of the proof mass, such as due to a linear acceleration along the sense axis due to a sensed force such as a vibration caused by the operating environment.

Periodic signal portions 218 partially composes the frequency scan signal pattern generated by frequency scan generator 202, which delivers the periodic signal portions 218 to correlator 222. As described herein, a variety of frequency patterns are provided to test the frequency of the sense signal 216. In some instances, the sampling of the sense signal 216 based on the periodic signal pattern 218 may occur such that the alignment shows relatively little correlation despite a similar frequency. Shifted periodic signal portions 220 may provide a mechanism for correcting for this error, by sensing at time-shifted locations (e.g., 90 degree shifted) within the sense signal 216. The signal patterns 218 and 220 may be provided in a variety of waveforms, such as square waves or stairstep sinusoidal pulse trains (e.g., a step-wise waveform approximating a sine wave).

Correlator 222 receives the periodic signal portions 218 from the frequency scan generator 202, the shifted periodic signal portions 220 from the frequency scan generator 202, and the sense signal 216, s(t), from the analog-to-digital converter 214. Correlator 222 correlates the sense signal 216, s(t), with the plurality of periodic signal portions 218 and the plurality of shifted periodic signal portions 220 to determine a first plurality and a second plurality of correlation values, for example, with a first and second correlation values generated for each test pattern frequency. These values, in turn, are used to determine a frequency of the motion imparted on the proof mass 204, as described herein. For example, in an embodiment correlator 222 generates an averaged correlation value 224 $C_k$ for each pulse train at a particular frequency on, by averaging the first plurality of correlation values and the second plurality of correlation values, which includes squaring each of the first plurality of correlation values, squaring each of the second plurality of correlation values, adding associated squares of the first plurality of correlation values and the second plurality of correlation values, and taking the square root of each of the added associated squares. However the correlation is calculated for each test pattern frequency, correlator 222 delivers a plurality of averaged correlation values 224, $C_k$, to a frequency test circuitry 226 to determine which frequency or frequencies, $f_k$, of the plurality of periodic signal portions 218 and shifted periodic signal portions 220 most closely corresponds to the frequency of the external vibration (e.g., sense signal 216, s(t)), G. In some embodiments, the frequency of sense signal 216, s(t), $C_k$, and the frequency, $f_k$, of the periodic signal portions 218 and the shifted periodic signal portions 220 may match but result in averaged correlation values, $C_k$, equal to zero if the sense signal 216, s(t), is 90 degrees out of phase with respect to the periodic signal portions 218 and the shifted periodic signal portions 220. The averaged correlation value 224, $C_k$, overcomes phase invariance by the correlator 222 receiving periodic signal portions 218 and shifted periodic signal portions 220 so that the averaged correlation value 224, $C_k$, is insensitive to the phase of the sense signal 216, s(t).

Figure 3:
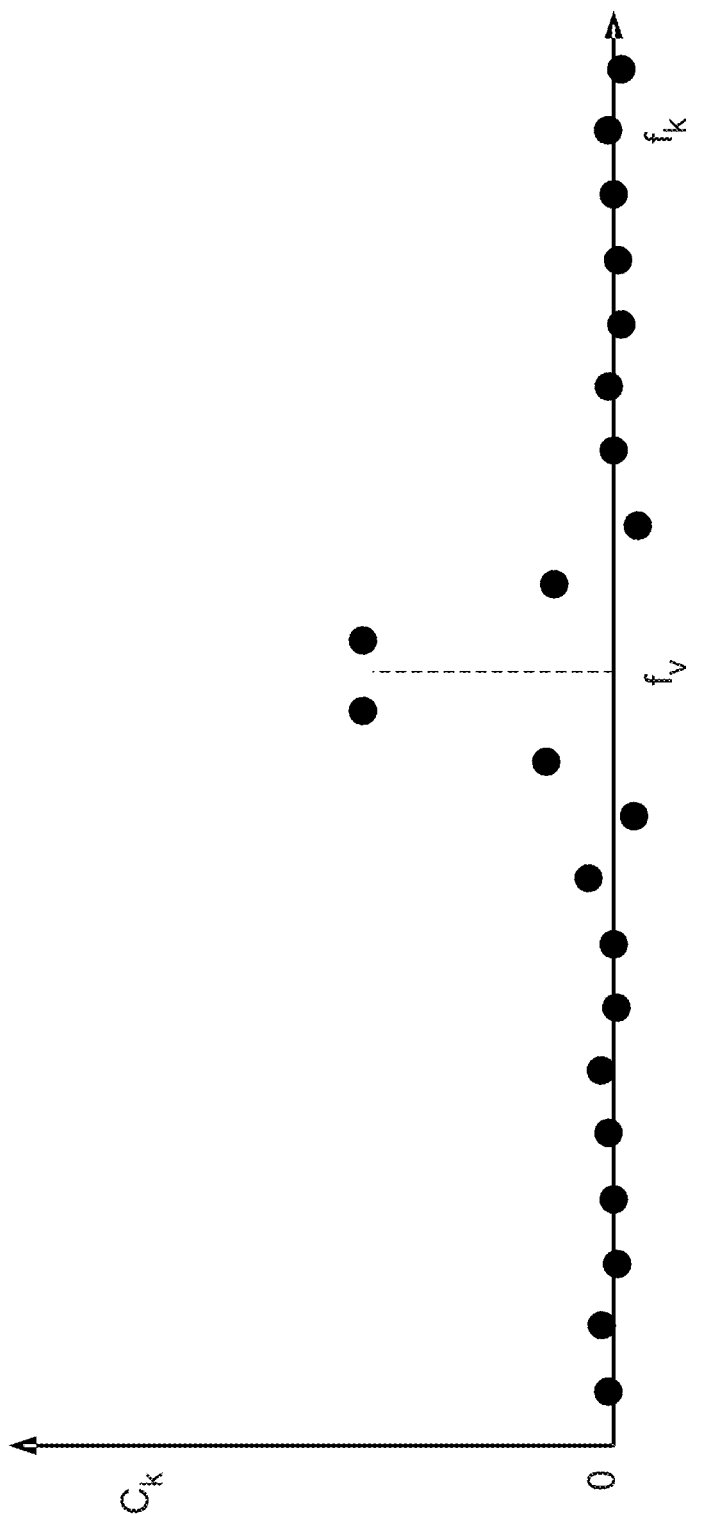
FIG. 3 shows an example chart of correlation values corresponding to an example vibration signal monitored with the MEMS accelerometer of FIG. 2 in accordance with an embodiment of the present disclosure.

FIG. 3 shows an example chart of correlation values corresponding to an example vibration signal monitored with the MEMS accelerometer of FIG. 2 in accordance with an embodiment of the present disclosure. FIG. 3 conveys how a plurality of periodic signal portions (e.g., including combined values based on periodic signal portions and shifted periodic signal portions), correlate to a sense signal, s(t), based on their respective frequencies, $f_k$, compared to the frequency of the sense signal, s(t), G. For example, a periodic signal portion with a frequency, $f_k$, close to the frequency of the sense signal, s(t), $f_v$, will show a high averaged correlation value, $C_k$. Contrarily, a periodic signal portion with a frequency, $f_k$, far from the frequency of the sense signal, s(t), $f_v$, will show a low averaged correlation value, $C_k$ (e.g., ~0). Where the respective frequencies, $f_k$, of the plurality of periodic signal portions approach the frequency of the sense signal, s(t), $f_v$, the corresponding averaged correlation values $C_k$ will peak as depicted in FIG. 3. By providing more periodic signal portions at a variety of frequencies, greater accuracy as to the vibration frequency $f_v$ can be established. In some embodiments, an iterative testing methodology may be utilized in which a likely range for the frequency is first identified using a low resolution and additional periodic signal portions are used within that likely range.

Figure 4:
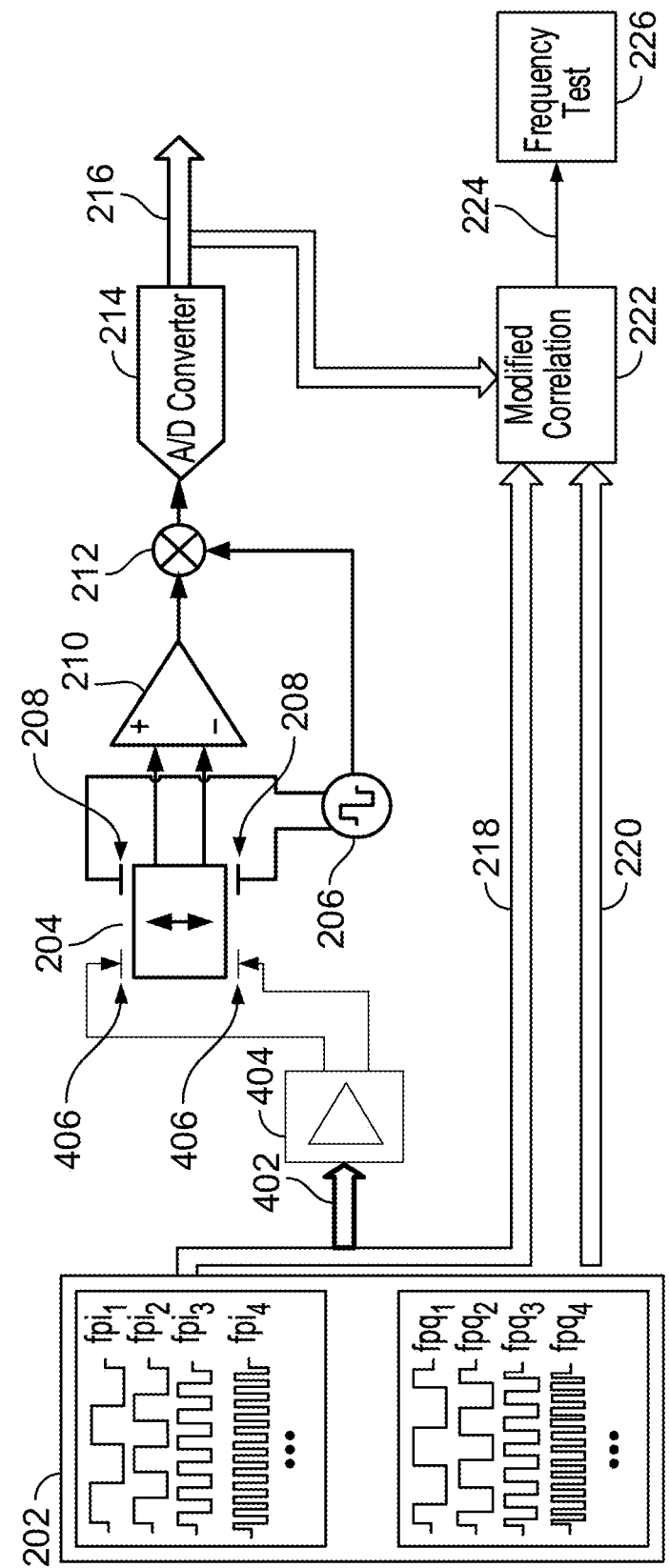
FIG. 4 shows an illustrative MEMS accelerometer with vibration monitoring based on injected signal patterns driving the MEMS in accordance with an embodiment of the present disclosure.

FIG. 4 shows an illustrative MEMS accelerometer with vibration monitoring based on injected signal patterns driving the MEMS in accordance with an embodiment of the present disclosure. The components of the MEMS accelerometer 200 of FIG. 2 are depicted in MEMS accelerometer 400 of FIG. 4, except that optional MEMS drive 402 delivers the frequency scan signal pattern to self-test drive 404, which provides a drive signal based on the frequency scan to self-test drive electrodes 406 to drive proof mass 204. Thus, the proof mass 204 is driven in accordance with the underlying periodic signals of the frequency scan as well as any external vibration. Accordingly, the output sense signal 216 includes a portion based on frequency scan periodic signals and a portion based on the external vibration. The combined sense signal is then processed by the correlator 222 in a similar manner as described with respect to FIG. 2, except that the sense signal being processed also includes a frequency scan signal portion (based on the frequency scan drive including periodic signal portions) that should be similar to the periodic signal portions 218 and phase-shifted periodic signal portions 220. Thus, this portion of the sense signal should correlate consistently with the periodic signal portions 218 and phase-shifted periodic signal portions 220 throughout the entire frequency scan, with any differences corresponding to the electromechanical translation via proof mass 204 and associated processing circuitry (e.g., C2V converter 210, mixer 212, and A/D converter 214). In some embodiments, a delay element (not depicted in FIG. 4) may be included between the frequency scan generator 202 and correlator 222 to match the delivery time of the periodic signal portions 218 to the correlator with the propagation delay of the applied frequency scan signal via the suspended spring-mass system and processing circuitry.

For the frequency scan signal portion of the sense signal, the resulting correlation values should be consistent throughout the entire frequency range of the frequency scan. The correlation values may be analyzed (e.g., by frequency test circuitry 226) to identify discrepancies that may correspond to errors or damage to the suspended spring-mass system or processing circuitry in the sense path. Example conditions indicative or damage or other errors may include an inconsistent baseline of correlation values (e.g., which is representative of a sense response that varies based on frequency), a frequency range where the correlation value differs from the baseline by more than a threshold (e.g., indicating an undesirable resonant frequency), changes in the frequency response baseline over time, rate of change in frequency response baseline over time, or other suitable analytics. The external vibration portion of the sense signal can also be analyzed simultaneously to determine the frequency of the vibration, as described with respect to FIG. 2. The principal difference is that in the embodiment of FIG. 4, the external vibration will be additive to the frequency scan contribution to the correlation values, as depicted and described with respect to FIG. 5.

Figure 5:
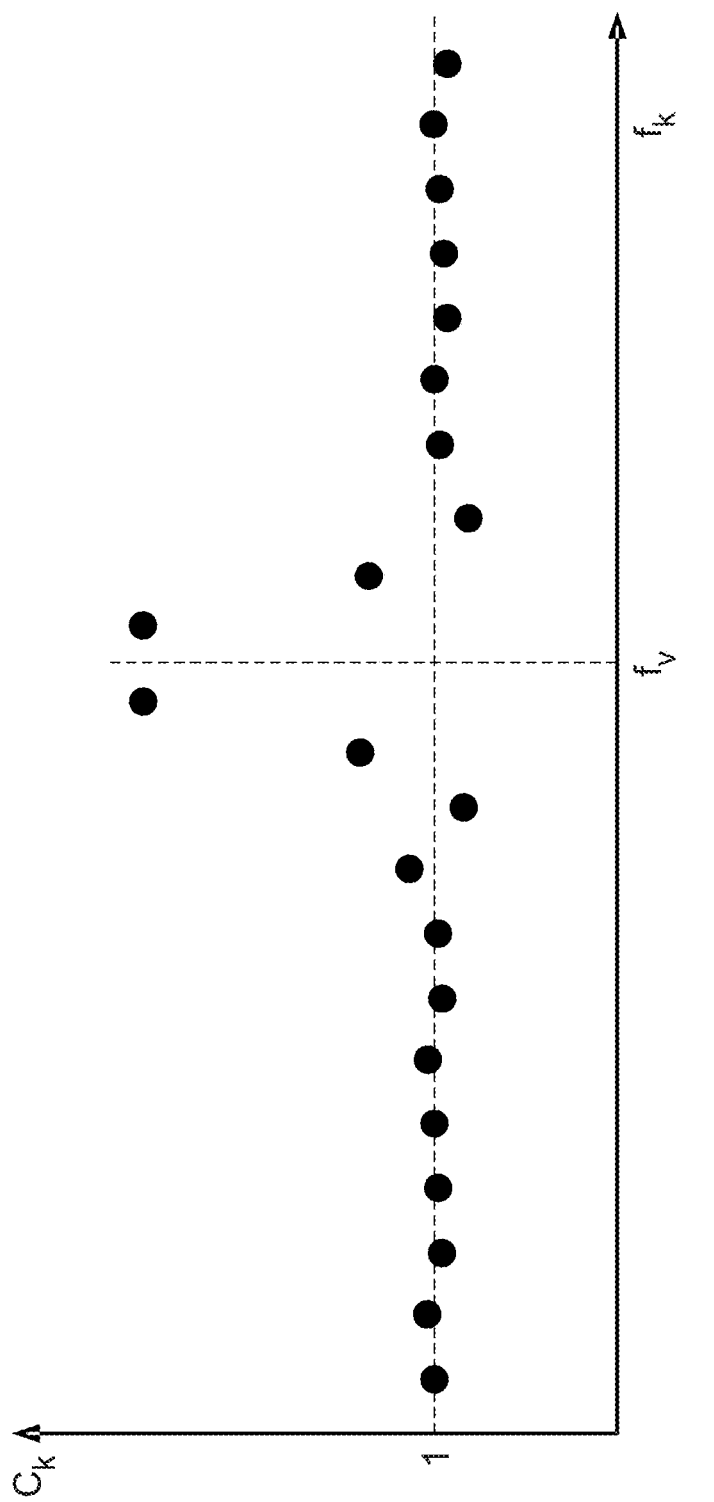
FIG. 5 shows an example chart of correlation values corresponding to an example vibration signal monitored with the MEMS accelerometer of FIG. 4 in accordance with an embodiment of the present disclosure.

FIG. 5 shows an example chart of correlation values corresponding to an example vibration signal monitored with the MEMS accelerometer of FIG. 4 in accordance with an embodiment of the present disclosure. FIG. 5 conveys how a plurality of periodic signal portions, including shifted periodic signal portions, correlate to a sense signal, s(t), based on their respective frequencies, $f_k$, compared to the frequency of the sense signal, s(t), G. A baseline of "1" corresponds to a typical frequency scan portion of the sense signal, which should correlate well with the same signal that was used to excite the proof mass. As discussed above, a vibration portion of the sense signal will be additive to the frequency scan portion, such that a periodic signal portion with a frequency, $f_k$, close to the frequency of the vibration portion of the sense signal, s(t), $f_v$, will show a higher averaged correlation value $C_k$. Contrarily, a periodic signal portion with a frequency, $f_k$, far from the frequency of the vibration portion of the sense signal, s(t), $f_v$, will have a correlation value $C_k$ (e.g., ~1) that is similar to the frequency scan signal baseline. The baseline correlation value is approximately equal to one because the sense signal, s(t), correlates with the plurality of periodic signal portions, including the plurality of shifted periodic signal portions, due to the plurality of periodic signal portions, including the plurality of shifted periodic signal portions, being injected into the proof mass of the MEMS via the optional MEMS drive.

Figure 6A:
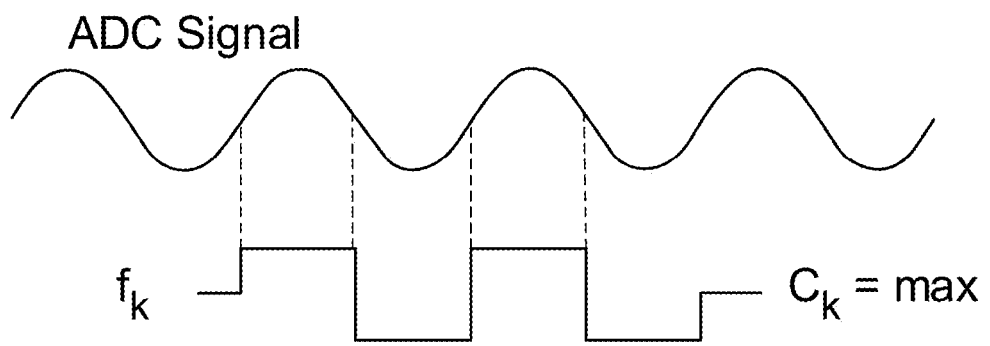
FIG. 6A shows an example diagram depicting an out-of-phase sense signal compared to a square wave signal pattern having a frequency $f_k$ in accordance with an embodiment of the present disclosure.
Figure 6B:
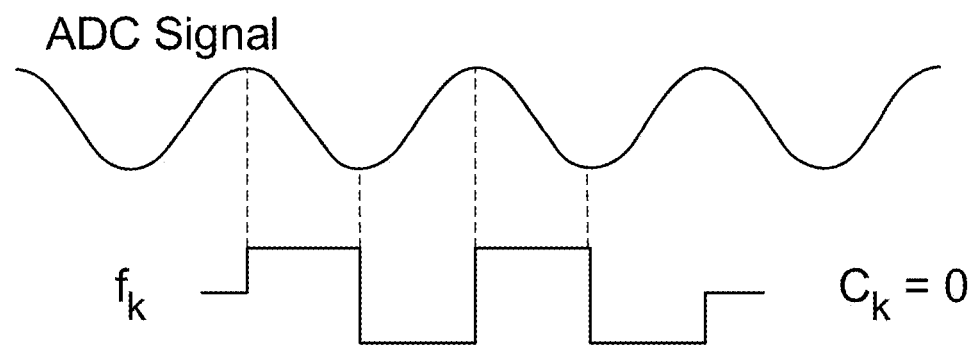
FIG. 6B shows an example diagram depicting an in-phase sense signal compared to a square wave signal pattern having a frequency $f_k$ in accordance with an embodiment of the present disclosure.

FIG. 6A shows an example diagram depicting an out-of-phase sense signal compared to a square wave signal pattern having a frequency $f_k$ in accordance with an embodiment of the present disclosure while FIG. 6B shows an example diagram depicting an in-phase sense signal compared to a square wave signal pattern having a frequency $f_k$ in accordance with an embodiment of the present disclosure. In FIG. 6A, the frequency, $f_k$, of the periodic signal portion matches the frequency of the in-phase sense signal, s(t), $f_v$, and the phases are lined up so that the square wave is associated with the positive portion of the ADC signal, which results in a relatively high correlation value, $C_k$. Contrarily, in FIG. 6B, even though the frequency, $f_k$, of the periodic signal portion matches the frequency of the out-of-phase sense signal, s(t), $f_v$, the averaged correlation value, $C_k$, equals zero because the sense signal, s(t), is 90 degrees out-of-phase with respect to the square pulse frequency, $f_k$, such that the positive and negative portions of the ADC signal cancel.

Figure 7:
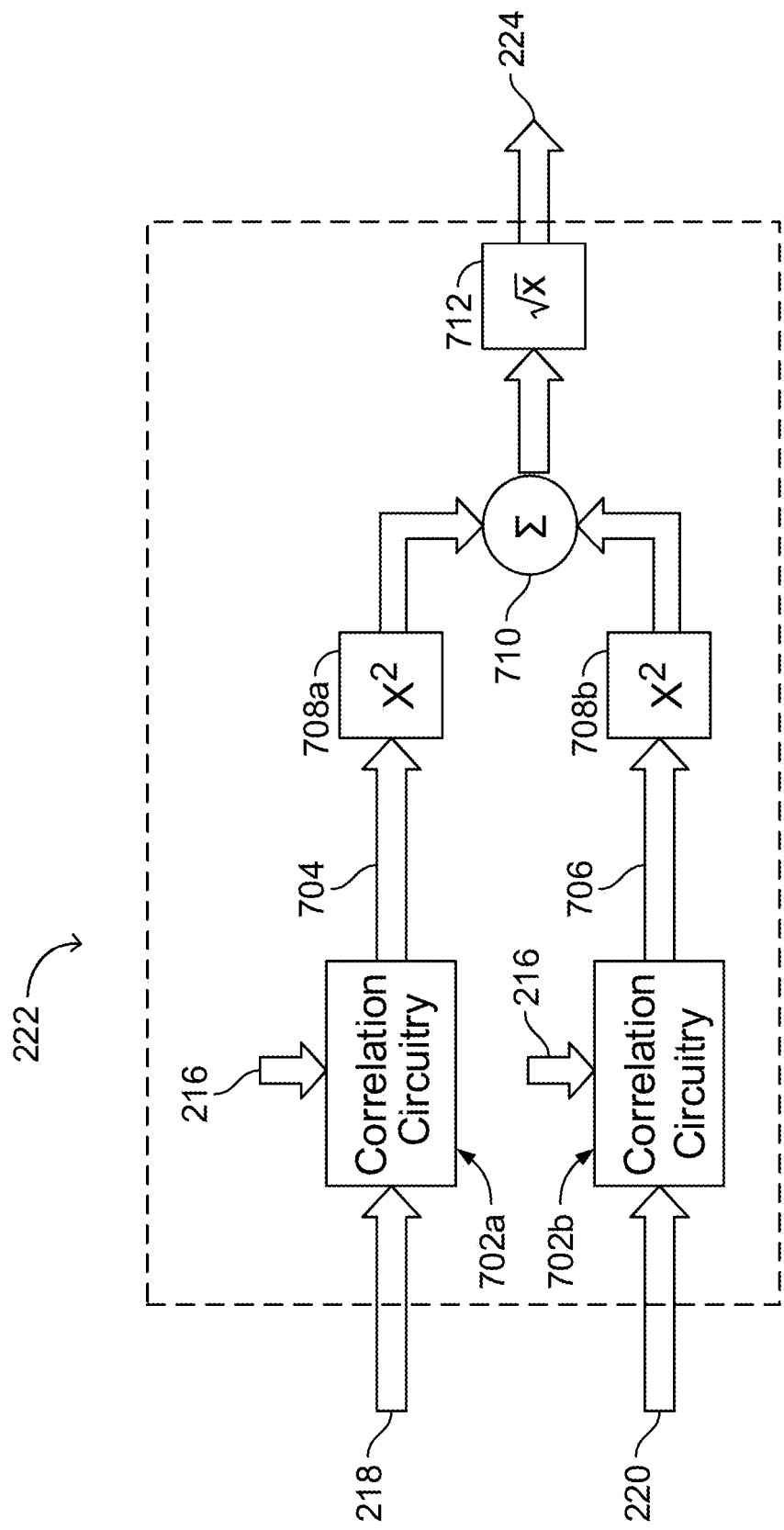
FIG. 7 shows an example MEMS correlator design including a phase-shifted signal pattern in accordance with an embodiment of the present disclosure.

FIG. 7 shows an example MEMS correlator design including a phase-shifted signal pattern in accordance with an embodiment of the present. Sense signal 216, s(t), periodic signal portions 218, shifted periodic signal portions 220, correlator 222, and averaged correlation value 224, $C_k$, of FIG. 2 are depicted in FIG. 7. Correlation circuitry 702a receives a plurality of periodic signal portions 218 from the frequency scan generator 202 (e.g., via a delay element), correlation circuitry 702b receives a plurality of shifted periodic signal portions 220 from the frequency scan generator 202 (e.g., via a delay element), and each of correlation circuitry 702a and 702b receive sense signal 216 from the analog-to-digital converter 214. Correlation circuitry 702a correlates the sense signal 216 with the plurality of periodic signal portions 218 to determine a first plurality of correlation values 704 while correlation circuitry 702b correlates the plurality of shifted periodic signal portions 220 to determine a second plurality of correlation values 706. The first plurality of correlation values 704 are delivered by correlation circuitry 702 to squaring circuitry of processing circuitry 708a, and the second plurality of correlation values 706 are delivered by correlation circuitry 702 to squaring circuitry of processing circuitry 708b. Squaring circuitry of processing circuitry 708a squares each of the first plurality of correlation values 704 and delivers the resulting squares to sum circuitry of processing circuitry 710, while squaring circuitry of processing circuitry 708b squares each of the second plurality of correlation values 706 and delivers the resulting squares to sum circuitry of processing circuitry 710. The sum circuitry 710 adds associated squares of the first plurality of correlation values 704 and the second plurality of correlation values 706 and delivers the resulting sum to square root circuitry of processing circuitry 712, which takes the square root of the added associated squares and produces the averaged correlation value 224, $C_k$. Accordingly, the averaged correlation value 224, $C_k$, proves to be robust to any vibration phase included in the sense signal 216, s(t). Such a square root determination by square root circuitry 712 may only be required necessary when a proportional output is needed, such as direct determination of frequency. In embodiments where such a response is not needed, such as threshold crossing detection, linearity is not strictly necessary and block 712 might be removed.

Figure 8A:
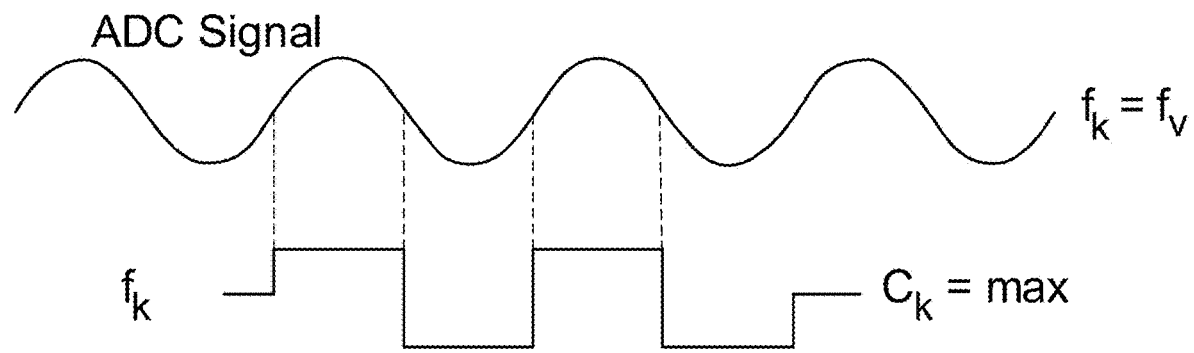
FIG. 8A shows an example diagram depicting a sense signal at a first frequency compared to a square wave signal pattern having a frequency in accordance with an embodiment of the present disclosure.
Figure 8B:
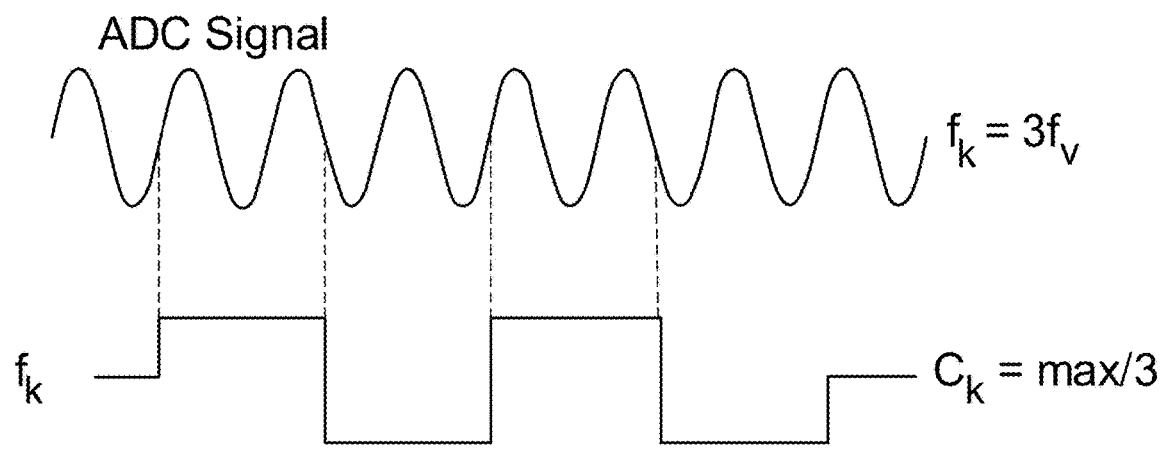
FIG. 8B shows an example diagram depicting a sense signal at a harmonic of the first frequency of FIG. 8A compared to a square wave signal pattern having a frequency in accordance with an embodiment of the present disclosure.

FIG. 8A shows an example diagram depicting a sense signal at a first frequency compared to a square wave signal pattern having a frequency in accordance with an embodiment of the present disclosure while FIG. 8B shows an example diagram depicting a sense signal at a harmonic of the first frequency of FIG. 8A compared to a square wave signal pattern having the same frequency as in FIG. 8A in accordance with an embodiment of the present disclosure. In FIG. 8A, the frequency, $f_k$, of the periodic signal portion matches the frequency of the in-phase sense signal, s(t), $f_v$, which results in a maximum averaged correlation value, $C_k$. In FIG. 8B, the periodic signal portion aligns with an odd harmonic (e.g., third harmonic) of the sense signal, such that the correlation with the harmonic results in a partial correlation with the periodic signal at frequency $f_k$. For example, the periodic signal portion aligns with a third harmonic of the sense signal, s(t), (e.g., $f_k=3*f_v$, wherein $f_v$ is the frequency of the sense signal, s(t)) that results in the averaged correlation value, $C_k$, decreasing by a factor of three (e.g., $C_k$=max/3) versus a comparison to a $f_v$ sense signal, but nonetheless resulting in a correlation value which is high enough to register as a possible match for an external vibration. Such an effect may occur at multiple odd harmonics (e.g., $5*f_v$, $7*f_v$, $9*f_v$) of the periodic signal portion frequency, resulting in possible errors in identifying the frequency of vibration. In some embodiments, it may therefore be desirable to identify likely harmonics based on maximum correlation peaks and utilize the identification of those harmonics and the relative correlation values to more accurately identify the actual frequency.

Figure 9A:
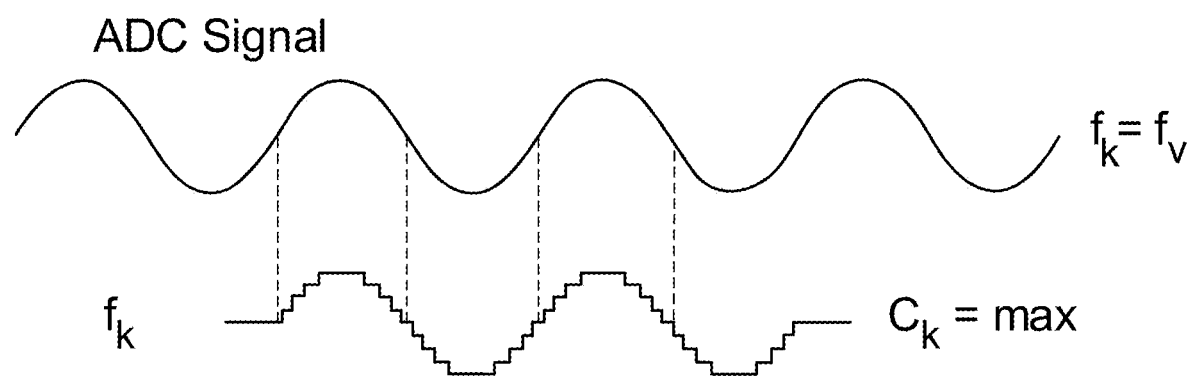
FIG. 9A shows an example diagram depicting the sense signal of FIG. 8A compared to a stairstep sinusoidal signal pattern having a frequency $f_k$ in accordance with an embodiment of the present disclosure.
Figure 9B:
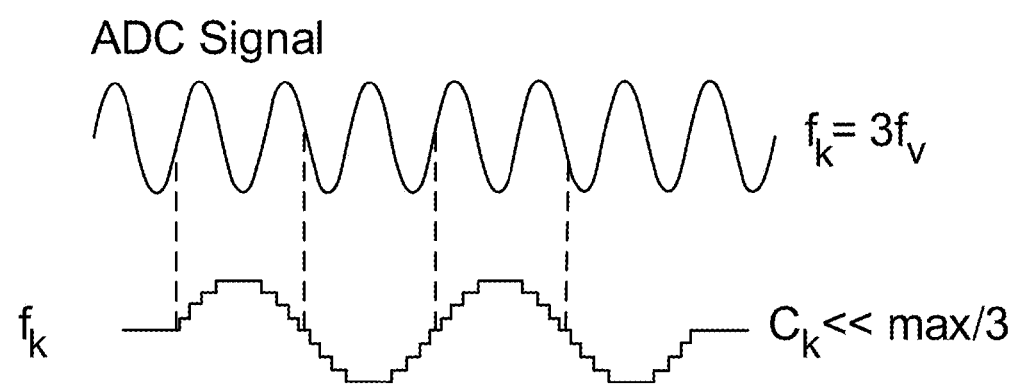
FIG. 9B shows an example diagram depicting the sense signal of FIG. 8B compared to a stairstep sinusoidal signal pattern having a frequency $f_k$ in accordance with an embodiment of the present disclosure.

FIG. 9A shows an example diagram depicting the sense signal of FIG. 8A compared to a stairstep sinusoidal signal pattern having a frequency $f_k$ in accordance with an embodiment of the present disclosure, while FIG. 9B shows an example diagram depicting the sense signal of FIG. 8B compared to a stairstep sinusoidal signal pattern having a frequency $f_k$ in accordance with an embodiment of the present disclosure. Although the underlying periodic signal portions of the frequency scan have been depicted as square wave signals having different frequencies in certain figures and discussion herein, it will be understood that different waveform types, such as sinusoidal waveforms (e.g., a "filtered sinusoid" whereby the stairstep component is removed by a low-pass filter, a "wavelet," or a "windowed sinusoid" that is a sinusoid multiplied by an suitable envelope function (window) to have a smooth beginning and ending), may be used. In an embodiment as depicted and described in FIGS. 9A and 9B, a sinusoidal waveform may be approximated by a stairstep sinusoidal signal pattern, with the resolution of the stepwise sinusoidal signal pattern based on a number of available bits used to generate the stepwise pattern. In FIG. 9A, the frequency, $f_k$, of the periodic signal portion matches the frequency of the in-phase sense signal, s(t), $f_v$, which results in a maximum averaged correlation value, $C_k$. In FIG. 9B, the periodic signal portion responds to a third harmonic (e.g., image frequency) of the sense signal, s(t), (e.g., $f_k=3*f_v$, wherein $f_v$ is the frequency of the sense signal, s(t)), however, the stairstep sinusoidal pulse train (e.g., a step-wise waveform) mitigates the periodic signal portion's correlation to the third harmonic of sense signal, s(t), since measurements are taken at points where the stairstep sinusoidal pulse train is not at its maximum. Accordingly, the averaged correlation value, $C_k$, decreases significantly (e.g., $C_k<<max/3$) compared to the square-wave case depicted in FIG. 8B, resulting in lower correlation value for harmonics (e.g., $5*f_v$, $7*f_v$, $9*f_v$) of sense signal, s(t).

Figure 10A:
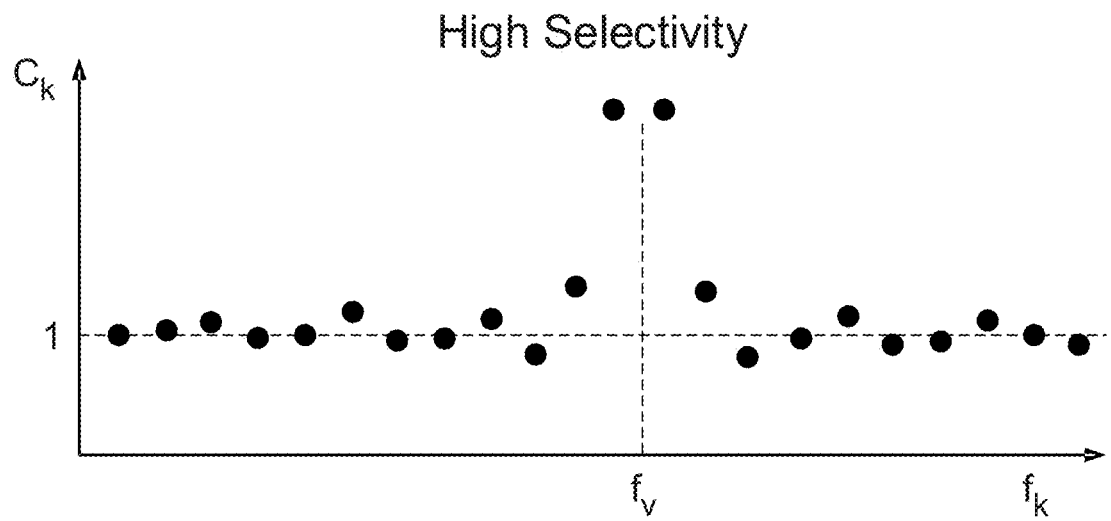
FIG. 10A shows an example diagram depicting a high selectivity dot graph corresponding to use of the stairstep sinusoidal signal pattern in accordance with an embodiment of the present disclosure.
Figure 10B:
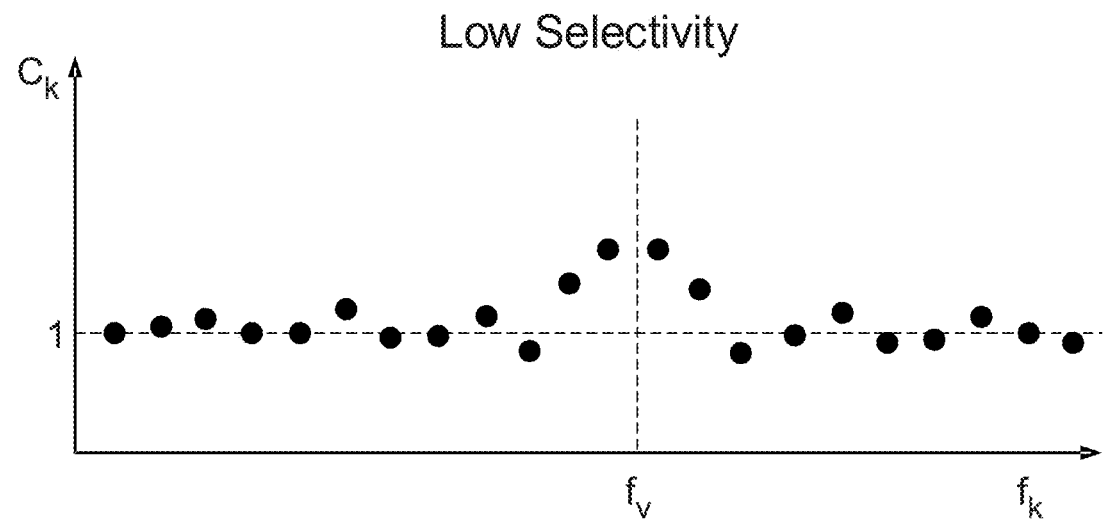
FIG. 10B shows an example diagram depicting a low selectivity dot graph in corresponding to use of the square wave sinusoidal signal pattern in accordance with an embodiment of the present disclosure.

FIG. 10A shows an example diagram depicting a high selectivity dot graph corresponding to use of the stairstep sinusoidal signal pattern in accordance with an embodiment of the present disclosure (e.g., FIGS. 9A and 9B), while FIG. 10B shows an example diagram depicting a low selectivity dot graph in corresponding to use of the square wave sinusoidal signal pattern in accordance with an embodiment of the present disclosure (e.g., FIGS. 8A and 8B). Frequency selectivity corresponds by how much the averaged correlation value, $C_k$, exceeds the next highest features in the $f_k$-$C_k$ spectrum. Accordingly, the high selectivity dot graph, shown in FIG. 10A, depicts a large difference between averaged correlation values, $C_k$, with frequencies, $f_k$, near the frequency of the sense signal, s(t), $f_v$, as opposed to averaged correlation values, $C_k$, with harmonic frequencies, $f_k$, farther from the frequency of the sense signal, s(t), which contributes to determining a vibration from background noise. Contrarily, the low selectivity dot graph, shown in FIG. 10B, depicts a less pronounced difference between averaged correlation values, $C_k$, with frequencies, $f_k$, near the frequency of the sense signal, s(t), $f_v$, as opposed to averaged correlation values, $C_k$, with frequencies, $f_k$, farther from the frequency of the sense signal, s(t), G. Frequency selectivity may improve as a function of a longer value of T, where T is the duration of a single periodic signal packet (e.g., corresponding to the number of "bits" of the periodic waveform). Frequency resolution is the difference in frequency (e.g., $\Delta f$) between two adjacent signal portions (e.g., $f_k$ and $f_{k+1}$) and improves linearly with the number of frequency samples recorded. In some embodiments, a hierarchical approach may be used to determine a background vibration, which includes a low resolution, low selectivity scan, as depicted in FIG. 10B and FIGS. 8A-8B, to identify potential vibration sites based on bumps within the $f_k$-$C_k$ spectrum. For each identified bump, a high resolution, high selectivity scan, as depicted in FIG. 10A and FIGS. 9A-9B, is used to determine whether a background vibration exists or not. Where there is no vibration the bump will disappear and if a vibration is present, the bump will become a peak and an accurate reading of its frequency and amplitude can be achieved.

Figure 11:
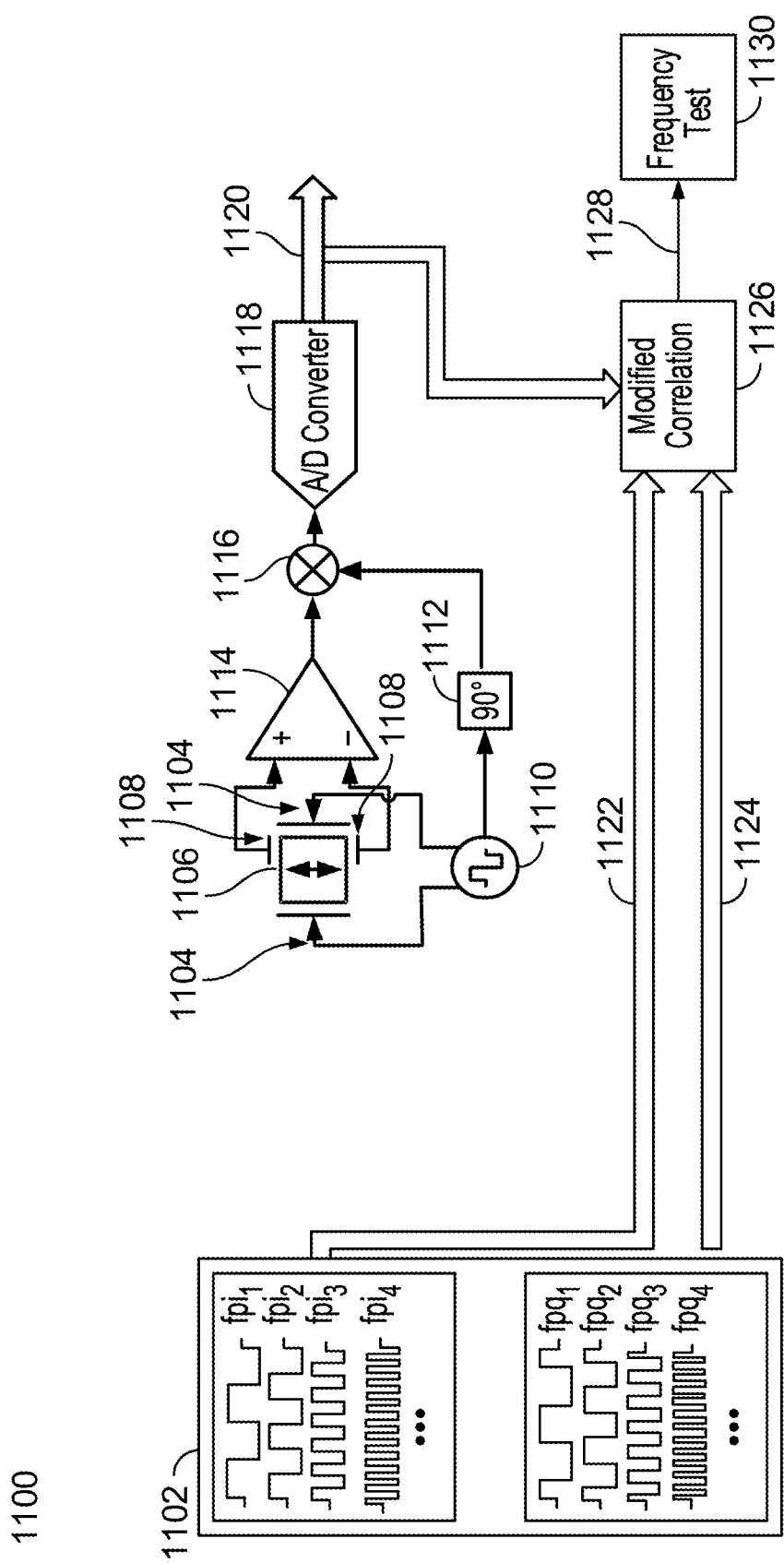
FIG. 11 shows an illustrative MEMS gyroscope with vibration monitoring in accordance with an embodiment of the present disclosure.

FIG. 11 shows an illustrative MEMS gyroscope with vibration monitoring in accordance with an embodiment of the present disclosure. The principle of operation of the MEMS gyroscope is similar to that described herein for the MEMS accelerometer of FIG. 2, with appropriate modifications made in order to properly process an external rotational vibration signal. In the depicted embodiment, an exemplary MEMS gyroscope 1100 has a particular configuration for sensing an amplitude and a frequency of an external rotational vibration, including a frequency scan generator, drive electrodes, a proof mass, sense electrodes, a signal generator of processing circuitry, a 90-degree phase shift, a capacitance to voltage (C2V) amplifier, a frequency mixer, an analog-to-digital converter, a sense signal, s(t), periodic signal portions, shifted periodic signal portions, a correlator, an averaged correlation value, and a frequency circuitry of processing circuitry. It will be understood that the present invention is applicable to any suitable MEMS gyroscope configurations (e.g., for sensing angular velocity about any suitable axis or combination of axes, in any suitable sense plane), including modifications to any of the above or other features such as additional drive electrodes, additional sense electrodes, varied locations and types of processing circuitry, and additional circuitry such as additional processing.

The exemplary MEMS gyroscope 1100 includes a frequency scan generator 1102, which couples to correlator 1126. The frequency scan generator 1102 generates a frequency scan signal pattern, wherein the frequency scan signal pattern includes a plurality of periodic signal portions 1122 and a plurality of shifted periodic signal portions 1124, each having a test frequency, $f_k$ (e.g., at a frequency range associated with a range of interest for external vibrations). The frequency scan generator 1102 generates and delivers the plurality of periodic signal portions 1122 and the plurality of shifted periodic signal portions 1124 to correlator 1126. The shifted periodic signal portions 1124 are shifted by $T_k/4$ (e.g., 90 degrees), wherein $T_k$ is the period of each sample of the frequency scan signal pattern (e.g., the time for once cycle of a waveform to complete). It will be understood that the shifted periodic signal portions 1124 may be shifted by any suitable time or degree. In some embodiments, the frequency scan signal pattern, which includes the plurality of periodic signal portions 1122 and the plurality of shifted periodic signal portions 1124, may implement a plurality of signal amplitudes.

Drive signal generator 1110 provides a drive signal to drive electrodes 1104 which in turn cause a drive motion within components of the suspended spring-mass system (e.g., drive masses, springs, lever arms, Coriolis masses, etc.) to move at the drive frequency of the gyroscope. In the presence of a rotational vibration about the measurement axis of the MEMS gyroscope, a Coriolis force causes movement of the proof mass 1106 along an axis (e.g., depicted by the arrow of proof mass 1106 in FIG. 11) perpendicular to the axis of the drive motion and the axis about which the rotation occurs. In some embodiments, the frequency scan generator 1102 may also apply a force directly or indirectly to the proof mass 1106 via an optional MEMS drive, as depicted and described with respect to FIG. 12. In the embodiment depicted in FIG. 11, the periodic signal portions 1122 and the shifted periodic signal portions 1124 are injected to cause movement of proof mass 1106, such that an output signal sensed by sense electrodes 1108 corresponds only to the sensed external vibration.

Sense electrodes 1108 couple and form capacitors with proof mass 1106 for sensing the movement of proof mass 1106 relative to the sense electrodes 1108, in accordance with the Coriolis forces generated by the external vibration and the drive signal delivered by drive electrodes 1104. The proof mass's 1106 movement generates a change in capacitance between respective sense electrodes 1108 (e.g., parallel capacitor plates with respect to proof mass 1106) and proof mass 1106, which the proof mass 1106 outputs to C2V converter 1114 via sense electrodes 1108 as capacitance signals. The C2V converter 1114 receives the capacitance signals from proof mass 1106 via sense electrodes 1108, converts the capacitance signals into a suitable analog output signals (e.g., proportional voltage or current), and delivers the output to frequency mixer 1116. Based on the sensed Coriolis force being 90 degrees out-of-phase from the drive motion, the output from C2V converter 1114 is 90 degrees out-of-phase from the original drive signal, which is operating as a carrier signal for the baseband Coriolis signal. Accordingly, the signal from the drive signal generator is phase shifted by 90-degree phase shift 1112 to be in phase with the output signal from C2V converter 1114. Frequency mixer 1116 cancels out the carrier drive signal from the received signal from C2V converter 1114 and delivers the resulting analog signals to analog-to-digital converter 1118. Analog-to-digital converter 1118 receives the analog signals from frequency mixer 1116 and converts them into a digital signal that corresponds to the baseband external vibration sensed by movement of proof mass 1106.

Periodic signal portions 1122 and shifted periodic signal portions 1124 collectively compose the frequency scan signal pattern generated by frequency scan generator 1102, which delivers the periodic signal portions 1122 and shifted periodic signal portions to correlator 1126. As described herein, although square wave patterns are depicted in FIG. 11, in other embodiments other waveform patterns (e.g., a stepwise sinusoidal pattern) may be utilized for the periodic signal portions. Further, although the periodic signal portions are depicted as being provided in a particular order (e.g., increasing) and change in frequency (e.g., doubling), it will be understood that the frequency scan can be provided in different manners, such as via testing and interpolation in any of the embodiments described herein.

Correlator 1126 receives the periodic signal portions 1122 from the frequency scan generator 1102, the shifted periodic signal portions 1124 from the frequency scan generator 1102, and the sense signal 1120, s(t), from the analog-to-digital converter 1118. Correlator 1126 correlates the sense signal 1120, s(t), with the plurality of periodic signal portions 1122 and the plurality of shifted periodic signal portions 1124 to determine a first plurality and a second plurality of correlation values. Correlator 1126 generates an overall correlation value 1128, $C_k$, as described herein, such as by averaging the first plurality of correlation values and the second plurality of correlation values (e.g., by squaring each of the first plurality of correlation values, squaring each of the second plurality of correlation values, adding associated squares of the first plurality of correlation values and the second plurality of correlation values, and taking the square root of each of the added associated squares). Correlator 1126 delivers a plurality of averaged correlation values 1128, $C_k$, to a frequency circuitry 1130 to determine which frequency, $f_k$, of the plurality of periodic signal portions 1122 and shifted periodic signal portions 1124 most closely corresponds to the frequency of the external vibration (e.g., sense signal, s(t)), $f_v$, as described herein. The averaged correlation value 1128, $C_k$, overcomes phase invariance by the correlator 1126 receiving periodic signal portions 1122 and shifted periodic signal portions 1124 so that the averaged correlation value 1128, $C_k$, is insensitive to the phase of the sense signal 1120, s(t). Frequency circuitry 1130, which receives the plurality of averaged correlation values 1128, $C_k$, from correlator 1126, determines the frequency associated with the sense signal 1120, s(t), based on the plurality of averaged correlation values 1128, $C_k$, as described herein.

Figure 12:
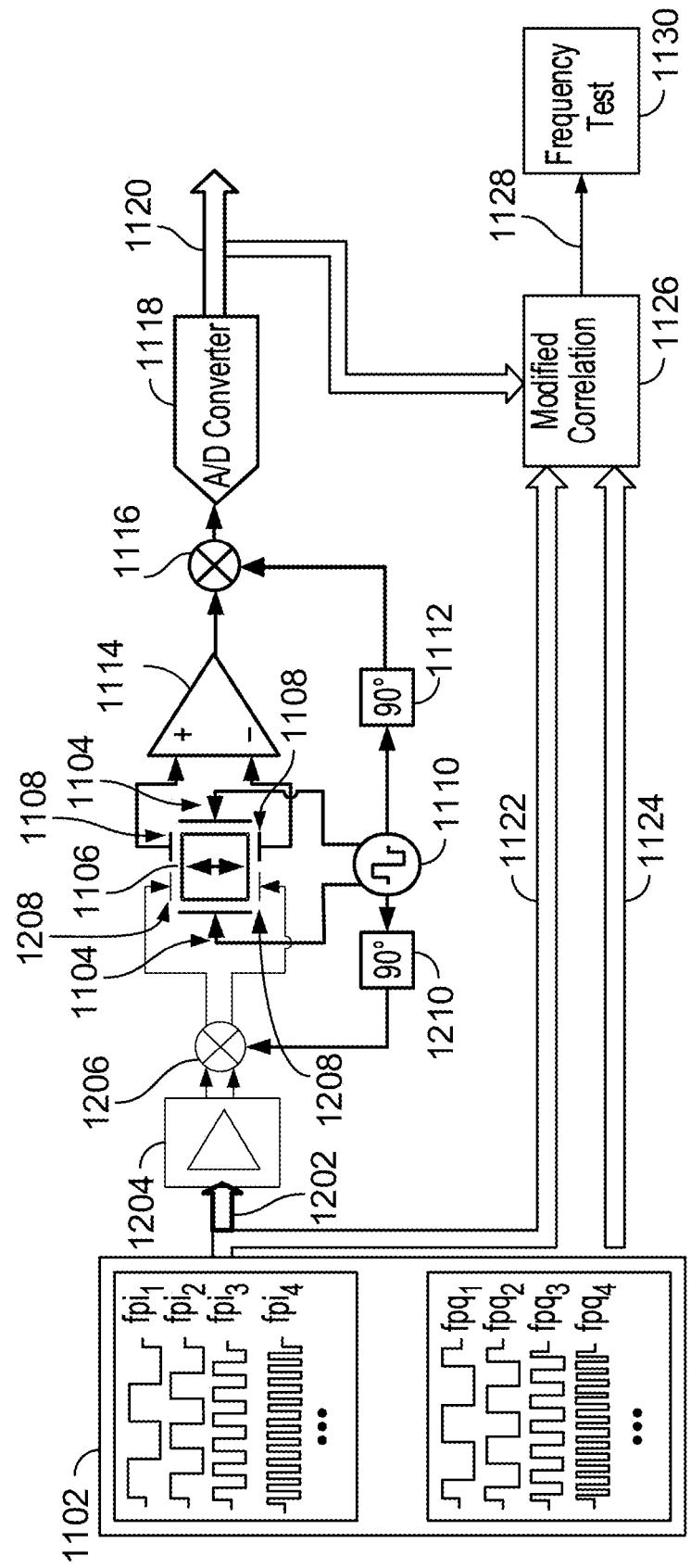
FIG. 12 shows an illustrative MEMS gyroscope with vibration monitoring based on injected signal patterns driving the MEMS in accordance with an embodiment of the present disclosure.

FIG. 12 shows an illustrative MEMS gyroscope with vibration monitoring based on injected signal patterns driving the MEMS in accordance with an embodiment of the present disclosure. The principle of operation of the MEMS gyroscope is similar to that described herein for the MEMS accelerometer of FIG. 4, with appropriate modifications made in order to properly process an external rotational vibration signal. The components of the MEMS gyroscope 1100 of FIG. 11 are depicted in MEMS gyroscope 1200 of FIG. 12, except that optional MEMS drive 1202 delivers the frequency scan signal pattern to self-test drive 1204, self-test drive 1204 couples to frequency mixer 1206, frequency mixer 1206 receives the frequency scan signal pattern from self-test drive 1204 and a 90-degree phase shifted 1210 drive signal from the drive signal generator 1110, and self-test drive electrodes 1208 couple to proof mass 1106 via frequency mixer 1206. In this manner, the periodic signal pattern of the frequency scan is applied to the drive mass directly via the self-test drive electrodes 1208, including the appropriate and phase-aligned drive (physical carrier) signal. Thus, the proof mass 1106 is driven in accordance with the underlying periodic signals of the frequency scan as well as any external rotational vibration. Accordingly, the output sense signal 1120 includes a portion based on frequency scan periodic signals and a portion based on the external rotational vibration. The combined sense signal is then processed by the correlator 1126 in a similar manner as described with respect to FIG. 11, except that the sense signal being processed also includes a frequency scan signal portion (based on the frequency scan drive including periodic signal portions) that should be similar to the periodic signal portions 1122 and phase-shifted periodic signal portions 1124. Thus, this portion of the sense signal should correlate consistently with the periodic signal portions 1122 and phase-shifted periodic signal portions 1124 throughout the entire frequency scan, with any differences corresponding to the electromechanical translation via proof mass 1106 and associated processing circuitry (e.g., C2V converter 1114, mixer 1116, and A/D converter 1118). In some embodiments, a delay element (not depicted in FIG. 12) may be included between the frequency scan generator 1102 and correlator 1126 to match the delivery time of the periodic signal portions to the correlator with the propagation delay of the applied frequency scan signal via the suspended spring-mass system and processing circuitry.

For the frequency scan signal portion of the sense signal, the resulting correlation values should be consistent throughout the entire frequency range of the frequency scan. The correlation values may be analyzed (e.g., by frequency test circuitry 1130) to identify discrepancies that may correspond to errors or damage to the suspended spring-mass system or processing circuitry in the sense path. Example conditions indicative or damage or other errors may include an inconsistent baseline of correlation values (e.g., which is representative of a sense response that varies based on frequency), a frequency range where the correlation value differs from the baseline by more than a threshold (e.g., indicating an undesirable resonant frequency), changes in the frequency response baseline over time, rate of change in frequency response baseline over time, or other suitable analytics. The external vibration portion of the sense signal can also be analyzed simultaneously to determine the frequency of the vibration, as described with respect to FIG. 11. The principal difference is that in the embodiment of FIG. 12, the external vibration will be additive to the frequency scan contribution to the correlation values, as describe herein (e.g., in FIG. 5 and the accompanying discussion).

The foregoing is merely illustrative of the principles of this disclosure and various modifications may be made by those skilled in the art without departing from the scope of this disclosure. The embodiments described herein are provided for purposes of illustration and not of limitation. Thus, this disclosure is not limited to the explicitly disclosed systems, devices, apparatuses, components, and methods, and instead includes variations to and modifications thereof, which are within the spirit of the attached claims. The systems, devices, apparatuses, components, and methods described herein may be modified or varied to optimize the systems, devices, apparatuses, components, and methods. Although the present disclosure has been described with respect to an exemplary sensor such as a MEMS accelerometer and a MEMS gyroscope, it will be understood that the inventions described in the present disclosure will apply equally to any sensor that may be exposed to a high vibration environment, such as MEMS pressure sensors and the like.

What is claimed is:

1. A method for identifying a frequency of an external vibration by a microelectromechanical system (MEMS) inertial sensor, comprising:
   generating, by processing circuitry of the MEMS inertial sensor, a frequency scan signal pattern comprising a plurality of periodic signal portions each having a test frequency;
   sensing, by one or more sense electrodes of the inertial sensor, a movement of a proof mass of the inertial sensor over a period of time;
   generating, by the processing circuitry of the inertial sensor, a sense signal based on the sensed movement of the proof mass over the period of time;
   correlating, by the processing circuitry, the sense signal with the frequency scan signal pattern;
   generating, by the processing circuitry, a plurality of correlation values based on the correlating, wherein each of the plurality of correlation values is based on a correlation of the sense signal with one of the plurality of periodic signal portions; and
   identifying, by the processing circuitry, a frequency associated with the sense signal based on one or more of the generated plurality of correlation values.

2. The method of claim 1, further comprising providing the frequency scan signal pattern to one or more self-test drive electrodes of the inertial sensor, wherein the one or more self-test drive electrodes drive the proof mass of the inertial sensor in accordance with the frequency scan signal pattern, and wherein the sensed movement of the proof mass is based at least in part on the movement of the proof mass due to the frequency scan signal pattern.

3. The method of claim 2, wherein, in the absence of the external vibration, the generated correlation values are approximately equal, and wherein in the presence of the external vibration at the frequency, one or more generated correlation values associated with the frequency exceed the other correlation values by at least a threshold.

4. The method of claim 2, further comprising delaying the frequency scan signal pattern before the correlation, and wherein the delay corresponds to a propagation time from providing the frequency scan signal pattern to the self-test drive electrodes to the generation of the sense signal.

5. The method of claim 1, wherein the frequency scan signal pattern comprises a first frequency scan signal pattern and wherein the generated plurality of correlation values comprise a first plurality of correlation values, further comprising:
   generating a second frequency scan signal pattern comprising a 90 degree phase shifted version of the first frequency scan signal pattern;
   correlating the sense signal with the second frequency scan signal pattern;
   generating a second plurality of correlation values based on the correlating with the second frequency scan signal pattern, wherein each of the plurality of correlation values is based on a correlation of the sense signal with the second frequency scan signal pattern; and
   identifying the frequency associated with the sense signal based on the first plurality of correlation values and the second plurality of correlation values.

6. The method of claim 5, wherein the identifying comprises:
   averaging the first plurality of correlation values and the second plurality of correlation values to create an averaged plurality of correlation values; and
   determining the frequency associated with the sense signal based on the averaged plurality of correlation values.

7. The method of claim 6, wherein the averaging comprises:
   squaring each of the first plurality of correlation values;
   squaring each of the second plurality of correlation values;
   adding associated squares of the first plurality of correlation values and the second plurality of correlation values; and
   taking the square root of each of the added associated squares.

8. The method of claim 1, wherein the frequency scan signal pattern comprises a plurality of signal amplitudes.

9. The method of claim 8, wherein the plurality of signal amplitudes approximates a waveform.

10. The method of claim 9, wherein the waveform is a sinusoid.

11. The method of claim 1, wherein the identifying comprises identifying a plurality of odd harmonics and selecting a base frequency associated with the odd harmonics as the frequency.

12. The method of claim 1, wherein the identifying comprises identifying a plurality of generated correlation values that exceed a threshold and interpolating the frequency based on the plurality of correlation values that exceed the threshold.

13. The method of claim 1, wherein the inertial sensor is a gyroscope and the frequency is the frequency of a rotational force.

14. The method of claim 1, wherein the inertial sensor is an accelerometer and the frequency is the frequency of a linear acceleration.

15. The method of claim 1, wherein the plurality of periodic signal portions comprises square pulse trains.

16. The method of claim 1, wherein the plurality of periodic signal portions comprises approximately sinusoidal pulse trains.

17. A microelectromechanical system (MEMS) inertial sensor, comprising:
- a frequency scan generator that generates a frequency scan signal pattern, wherein the frequency scan signal pattern comprises a plurality of periodic signal portions each having a test frequency;
- a proof mass that responds to an inertial force;
- one or more sense electrodes that sense a movement of the proof mass;
- sense circuitry coupled to the proof mass, wherein the sense circuitry is configured to generate a sense signal based on the sensed movement of the proof mass detected by the one or more sense electrodes; and
- processing circuitry coupled to the sense circuitry; wherein the processing circuitry is configured to receive the sense signal generated by the sense circuitry, correlate the sense signal with the plurality of periodic signal portions to determine a plurality of correlation values, and identify a frequency associated with the sense signal based on one or more of the generated plurality of correlation values.

18. The inertial sensor of claim 17, further comprising one or more self-test drive electrodes, wherein the one or more self-test drive electrodes receive the frequency scan signal pattern and drive the proof mass of the inertial sensor in accordance with the frequency scan signal pattern, and wherein the sensed movement of the proof mass is based at least in part on the movement of the proof mass due to the frequency scan signal pattern.

19. The inertial sensor of claim 18, wherein, in the absence of an external vibration, the generated correlation values are approximately equal, and wherein in the presence of the external vibration at the frequency, one or more generated correlation values associated with the frequency exceed the other correlation values by at least a threshold.

20. The inertial sensor of claim 18, further comprising a delay element configured to delay the frequency scan signal pattern before the correlation, and wherein the delay corresponds to a propagation time from providing the frequency scan signal pattern to the self-test drive electrodes to the generation of the sense signal.

21. A method for monitoring a suspended spring-mass system and identifying a frequency of an external vibration by a microelectromechanical system (MEMS) inertial sensor, comprising:
- generating, by processing circuitry of the MEMS inertial sensor, a frequency scan signal pattern comprising a plurality of periodic signal portions each having a test frequency;
- providing the frequency scan signal pattern to a self-test drive electrode of the MEMS inertial sensor;
- driving, by the self-test drive electrode, a proof mass of the suspended spring-mass system based on the frequency scan signal pattern;
- sensing, by one or more sense electrodes of the inertial sensor, a movement of a proof mass of the inertial sensor over a period of time during which the frequency scan pattern drives the proof mass;
- generating, by the processing circuitry of the inertial sensor, a sense signal based on the sensed movement of the proof mass over the period of time;
- correlating, by the processing circuitry, the sense signal with the frequency scan signal pattern;
- identifying, by the processing circuitry, a frequency associated with the external vibration based on the correlating; and
- identifying, by the processing circuitry, an error associated with the suspended spring-mass system based on the correlating.

* * * * *